United States Patent
Bragdon

(10) Patent No.: US 11,443,348 B1
(45) Date of Patent: Sep. 13, 2022

(54) CONVERSATIONAL TARGETED CONTENT

(71) Applicant: Twitter, Inc., San Francisco, CA (US)

(72) Inventor: Andrew Bragdon, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 575 days.

(21) Appl. No.: 15/399,651

(22) Filed: Jan. 5, 2017

Related U.S. Application Data

(60) Provisional application No. 62/275,218, filed on Jan. 5, 2016.

(51) Int. Cl.
| | | |
|---|---|---|
| G06Q 30/00 | (2012.01) | |
| G06Q 30/02 | (2012.01) | |
| H04L 51/04 | (2022.01) | |
| H04L 51/18 | (2022.01) | |
| H04L 51/10 | (2022.01) | |

(52) U.S. Cl.
CPC ..... *G06Q 30/0276* (2013.01); *G06Q 30/0277* (2013.01); *H04L 51/04* (2013.01); *H04L 51/10* (2013.01); *H04L 51/18* (2013.01)

(58) Field of Classification Search
None
See application file for complete search history.

(56) References Cited

U.S. PATENT DOCUMENTS

| | | | |
|---|---|---|---|
| 8,924,326 B2 | 12/2014 | Arquette et al. | |
| 9,117,227 B1 * | 8/2015 | Agrawal | G06Q 30/0275 |
| 9,361,322 B1 | 6/2016 | Dutta et al. | |
| 9,449,050 B1 | 9/2016 | Molina et al. | |
| 9,454,771 B1 | 9/2016 | Agrawal et al. | |
| 9,483,529 B1 | 11/2016 | Pasol et al. | |
| 9,892,431 B1 | 2/2018 | Agrawal et al. | |
| 10,003,560 B1 | 6/2018 | Perkins et al. | |
| 10,049,472 B1 | 8/2018 | Croom et al. | |
| 10,248,667 B1 | 4/2019 | Agrawal et al. | |

(Continued)

OTHER PUBLICATIONS

McMinn, Andrew J., et al. "An interactive interface for visualizing events on Twitter." Proceedings of the 37th international ACM SIGIR conference on Research & development in information retrieval. 2014. (Year: 2014).*

(Continued)

*Primary Examiner* — Michael Bekerman
(74) *Attorney, Agent, or Firm* — Smith Baluch LLP

(57) ABSTRACT

Techniques of the disclosure are directed to sending and receiving messages that allow for content providers to interact with potential recipients and customers. An information distribution system may receive a first message from a content provider via a first client device that includes targeted content, such as a string of characters, an image, a video, and/or some other form of media. The targeted content may also include tags, such as hashtags, which identify or otherwise associate a particular topic with the user-generated content. Further, the targeted content may include a selectable graphical user interface element that a user reading the content may interact with on a second client device. If the user selects the selectable graphical user interface element, the information distribution system may generate a custom message that may be sent on behalf of the user, which may also include a tag, such as a hashtag.

18 Claims, 5 Drawing Sheets

(56) References Cited

U.S. PATENT DOCUMENTS

| | | | |
|---|---|---|---|
| 10,250,547 B1 | 4/2019 | Jain et al. | |
| 10,747,805 B1 | 8/2020 | Bragdon | |
| 2002/0123928 A1 | 9/2002 | Eldering et al. | |
| 2008/0195466 A1* | 8/2008 | Wright | G06Q 30/02 705/14.41 |
| 2008/0235084 A1 | 9/2008 | Quoc et al. | |
| 2010/0217670 A1* | 8/2010 | Reis | G06Q 30/02 705/14.53 |
| 2011/0040751 A1 | 2/2011 | Chandrasekar et al. | |
| 2011/0106895 A1 | 5/2011 | Ventilla et al. | |
| 2011/0173570 A1* | 7/2011 | Moromisato | G06F 16/904 715/838 |
| 2012/0201362 A1 | 8/2012 | Crossan et al. | |
| 2013/0031090 A1 | 1/2013 | Posse et al. | |
| 2013/0110641 A1 | 5/2013 | Ormont et al. | |
| 2013/0317910 A1 | 11/2013 | Mohamed | |
| 2013/0325755 A1 | 12/2013 | Arquette et al. | |
| 2014/0164082 A1* | 6/2014 | Sun | G06Q 30/0214 705/14.16 |
| 2014/0195549 A1 | 7/2014 | Ahn et al. | |
| 2015/0020100 A1 | 1/2015 | Stark et al. | |
| 2015/0379555 A1* | 12/2015 | Dua | G06Q 30/0269 705/14.41 |
| 2018/0300757 A1 | 10/2018 | Saxena et al. | |
| 2020/0372065 A1 | 11/2020 | Bragdon | |

OTHER PUBLICATIONS

Jansen, Bernard J., et al. "Twitter power: Tweets as electronic word of mouth." Journal of the American society for information science and technology 60.11 (2009): 2169-2188. (Year: 2009).*

Kim, Eunice, Yongjun Sung, and Hamsu Kang. "Brand followers' retweeting behavior on Twitter: How brand relationships influence brand electronic word-of-mouth." Computers in Human Behavior 37 (2014): 18-25. (Year: 2014).*

Bragdon, "Introducing conversational ads," blog.twitter.com/2016/introducing-conversational-ads, Twitter Inc., Jan. 5, 2016, 6 pp.

Alex G., "Are carousels effective?" StackExchange User Experience, Aug. 22, 2011, Edited on Mar. 23, 2012, Retrieved from <http://ux.stackexchange.com/questions/10312/are-carousels-effective> 6 pgs.

Buytaert, "Rotating Banners," Drupal, First accessed on on Apr. 15, 2016 from <https://www.drupal.org/node/1786134> , 6 pgs.

Facebook Business, "Improving Ad Performance with the Carousel Format," Facebook, May 11, 2015, Retrieved from <https://www.facebook.com/business/news/carousel-ads> 4 pgs.

Facebook Business, "New Direct Response Features: Multi-Product Ads and Enhanced Custom Audiences from your Website," Jun. 26, 2014, Retrieved from <https://www.facebook.com/business/news/Multi-Product-Ads-and-Enhanced-Custom-Audiences-from-your-Website> 3 pgs.

Frost, "A user with cerebral palsy is demonstrating how he can't get to carousel items fast enough before it advances," Twitter, Sep. 24, 2014, Retrieved from <https://twitter.com/brad_frost/status/514919131855224832> 1 pg.

Nielsen, "Auto-Forwarding Carousels and Accordions Annoy Users and Reduce Visibility," Nielsen Norman Group, Jan. 19, 2013, Retrieved from <https://www.nngroup.com/articles/auto-forwarding/>.

Peatt, "An Exploration of Carousel Usage on Mobile E-Commerce Websites," Smashing Magazine, Feb. 9, 2015, Retrieved from <https://www.smashingmagazine.com/2015/02/carousel-usage-exploration-on-mobile-e-commerce-websites/> 25 pgs.

Runyon, "Carousel Interaction Stats," Erik Runyon, Jan. 22, 2013, Retrieved from <https://erikrunyon.com/2013/01/carousel-stats/> 4 pgs.

Sloane, "Twitter's new pitch to brands: Turn everyday fan tweets into ads," Digiday, Jan. 11, 2016, Retrieved from <http://digiday.com/platforms/twitters-new-pitch-brands-turn-everyday-fan-tweets-ads/> 3 pgs.

Wagner, "You Can Now Scroll Between Twitter Promoted Tweets," Recode, Apr. 1, 2015, Retrieved from <http://www.recode.net/2015/4/1/11561060/you-can-now-scroll-between-twitter-promoted-tweets> 2 pgs.

* cited by examiner

CONVERSATIONAL TARGETED CONTENT

This application claims the benefit of U.S. Provisional Application No. 62/275,218, filed Jan. 5, 2016, the entire contents of which are incorporated by reference herein.

BACKGROUND

Computing devices, such as smartphones, laptops, and desktop computers, have enabled users to generate, distribute, and consume user-generated content across a broad range of topics and geographic areas. Information distributions platforms may allow users to identify specific topics of interest and share information related to certain topics in a real- or near real-time manner. For example, an information distribution platform may allow users to label user-generated content with tags, such as hashtags, which identify or otherwise associate a particular topic with the user-generated content. In this way, information distribution platforms may allow users to search for user-generated content associated with a particular topic based on a hashtag. In some instances, content providers may promote certain products or services using these hashtags with compelling images or videos. However, these promotions may remain stagnant upon distribution, or recipients of the content may only interact with these promotions in the same way that the recipients may interact with other user-generated content.

SUMMARY

Techniques of the disclosure are directed to sending and receiving messages that allow for content providers to interact with potential recipients and customers. An information distribution system may receive a first message from a content provider via a first client device that includes targeted content, such as a string of characters, an image, a video, and/or some other form of media. The targeted content may also include tags, such as hashtags, which identify or otherwise associate a particular topic with the user-generated content. Further, the targeted content may include a selectable graphical user interface element that a user reading the content may interact with on a second client device. If the user selects the selectable graphical user interface element, the information distribution system may generate a custom message that may be sent on behalf of the user, which may also include a tag, such as a hashtag.

In addition, after selecting one of the selectable graphical user interface elements, the information distribution system may send an addendum to the initial first message, such as extra text or a new media file. The contents of the addendum may be based on the selected element, further enabling more directed and efficient content distribution. For instance, the contents of the addendum may be a video describing the product selected out of the graphical user interface elements.

In some examples, a method includes receiving, by an information distribution system and from a first client device, a first message comprising a first string of characters and at least one selectable graphical user interface element. The method further includes in response to receiving the first message, sending, by the information distribution system and for display at a second client device, the first message. The method further includes receiving, by the information distribution system and from the second client device, an indication of a first user input, wherein the first user input comprises a selection of a first selectable graphical user interface element of the at least one selectable graphical user interface element of the first message. The method further includes in response to receiving the indication of the first user input, sending, by the information distribution system and for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display. The method further includes receiving, by the information distribution system and from the second client device, the indication of the second user input. The method further includes in response to the second user input comprising the affirmation for the information distribution system to send the second string of characters to the group of one or more client devices for display, sending, by the information distribution system and for display at the group of one or more client devices, the second string of characters.

In some examples, a computing device includes at least one processor and at least one non-transitory computer-readable storage medium storing instructions that are executable by the at least one processor to receive from a first client device, a first message comprising a first string of characters and at least one selectable graphical user interface element. The instructions are further executable by the at least one processor to, in response to receiving the first message, send, for display at a second client device, the first message. The instructions are further executable by the at least one processor to receive, from the second client device, an indication of a first user input, wherein the first user input comprises a selection of a first selectable graphical user interface element of the at least one selectable graphical user interface element of the first message. The instructions are further executable by the at least one processor to, in response to receiving the indication of the first user input, send, for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display. The instructions are further executable by the at least one processor to receive, from the second client device, the indication of the second user input. The instructions are further executable by the at least one processor to, in response to the second user input comprising the affirmation for the information distribution system to send the second string of characters to the group of one or more client devices for display, send, for display at the group of one or more client devices, the second string of characters.

In some examples, a non-transitory computer-readable storage medium encoded with instructions that, when executed, cause at least one processor of a computing device to receive from a first client device, a first message comprising a first string of characters and at least one selectable graphical user interface element. The instructions further cause the at least one processor to, in response to receiving the first message, send, for display at a second client device, the first message. The instructions further cause the at least one processor to receive, from the second client device, an indication of a first user input, wherein the first user input comprises a selection of a first selectable graphical user interface element of the at least one selectable graphical user interface element of the first message. The instructions further cause the at least one processor to in response to receiving the indication of the first user input, send, for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display. The instructions further cause the at least one processor to receive, from the second client device, the indication of the second user input. The instructions further cause the at least one processor to in response to the second user input comprising the affirmation for the information distribution system to send the second string of characters to the group of one or more client devices for display, send, for display at the group of one or more client devices, the second string of characters.

The above techniques may enable a computing device or computing system to create a targeted message that enables an interactive experience with the user, rather than limiting a creator to only a one-sided message. These techniques further enable a content provider to enable multiple forms of interaction via a single targeted message, thereby increasing the amount of content provided to the user without necessarily increasing the size of the content on the screen of the user's computing device. In some instances, media may be more effective in conveying information regarding a product, especially if the user receiving the content has provided an indication that they are interested in the product. By including an addendum to the message after the user interacts with the content, the content provider may more effectively send content to the user that interests the user rather than guessing which product the user may be interested in. As the information distribution system may send fewer pieces of targeted content that are ineffective, the information distribution system may potentially consume less battery power and produce less congestion over the network.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
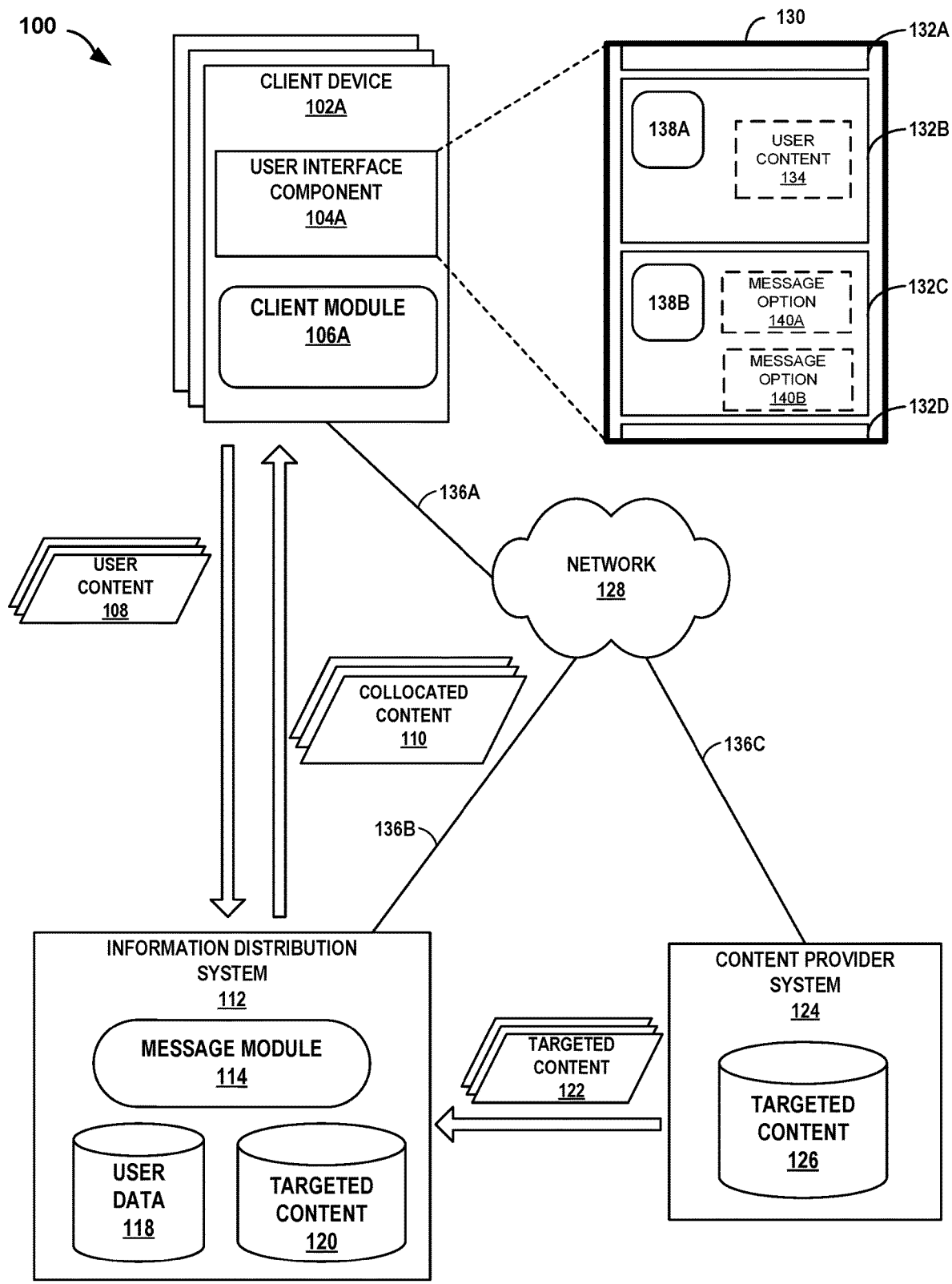
FIG. 1 is a conceptual diagram illustrating an example system including a computing device that is configured to create and output, for display at one or more client devices, targeted content that includes a conversational targeted message, in accordance with one or more aspects of the present disclosure.

Techniques of the disclosure are directed to sending and receiving messages that allow for content producers, such as content providers, to interact with potential recipients and customers. An information distribution system may receive a first message from a content provider via a first client device that includes targeted content, such as a string of characters, an image, a video, and/or some other form of media. The targeted content may also include tags, such as hashtags, which identify or otherwise associate a particular topic with the user-generated content. Further, the targeted content may include a selectable graphical user interface element that a user reading the targeted content may interact with on a second client device. If the user selects the selectable graphical user interface element, the information distribution system may generate a custom message that may be sent on behalf of the user, which may also include a tag, such as a hashtag. When provided with information associated with multiple selected graphical user interface elements from various users, the content provider may track how the various users respond to the particular targeted content in order to, e.g., provide more efficient promoting. Further, by allowing users to send out messages regarding the targeted content on behalf of the content provider, the targeted content may reach a broader audience. The broader audience is also reached by users themselves rather than by the content providers, which may provide more efficient and trustworthy promoting than if the targeted content came from the content provider.

In addition, after selecting one of the selectable graphical user interface elements, the information distribution system may send an addendum to the initial first message, such as extra text or a new media file. The contents of the addendum may be based on the selected element, further enabling more directed and efficient content distribution. For instance, the contents of the addendum may be a video describing the product selected out of the graphical user interface elements.

The above techniques may enable a computing device to create a targeted message that enable an interactive experience with the user, rather than limiting a creator to only a one-sided message. These techniques may further enable a content provider to enable multiple forms of interaction via a single targeted message, thereby increasing the amount of content provided to the user without necessarily increasing the size of the content on the screen of the user's computing device. In some instances, media may be more effective in conveying information regarding a product, especially if the user receiving the content has provided an indication that they are interested in the product. By including an addendum to the message after the user interacts with the content, the content provider may more effectively send content to the user that interests the user rather than guessing which product the user may be interested in. As the information distribution system may send fewer pieces of targeted content that are ineffective, the information distribution system may potentially consume less battery power and produce less congestion over the network.

FIG. 1 is a conceptual diagram illustrating an example system 100 including one or more computing devices or systems that are configured to create and output, for display at one or more client devices, targeted content, in accordance with one or more aspects of the present disclosure. System 100 includes client device 102A, information distribution system 112, content provider system 124, and network 128.

Network 128 represents any communication network (e.g., public, private, commercial, governmental, or residential) that communicatively links two or more computing devices or systems for the transmission of information. For example, network 128 may be a wireless and/or wired network for transmitting data between two or more computing devices located at two or more different physical locations. In some examples, network 128 may represent the Internet. Client device 102A, information distribution system 112, and content provider system 124 may send and receive data via network 128 using various suitable communication techniques. For instance, data may be transmitted between the devices using communication links 136A-136D, which may be wired and/or wireless links. Network 128 may include any required hardware for communicatively linking computing client device 102A, information distribution system 112, and content provider system 124. For example, network 128 may include various switches, hubs, routers, and other network equipment that provides for the exchange of information between the devices.

Client device 102A may represent any type of personal computing device from which a person can view, listen to, feel, or otherwise obtain output based at least in part on information received via a network, such as network 128. For example, client device 102A may be a laptop computer, a mobile telephone, a tablet computer, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

Client device 102A includes user interface component 104A. User interface component 104A may include various technologies for receiving input from, and/or outputting information to, a user of user device 102A. For example, user interface component 104A may include a microphone, a touch screen or other type of presence-sensitive screen, and other types of sensors and input devices for receiving input from a user. User interface component 104A may include a display (e.g., liquid crystal (LCD), light emitting diode (LED), organic light-emitting diode (OLED), or any other type of display), a speaker, a haptic feedback device, or any other type of output device for outputting visible, audible, and/or haptic feedback type information to a user of client device 104A. Although illustrated as a presence-sensitive display integrated with client device 102A, in some examples, user interface component 104A may be a display device, such as a monitor integrated in a laptop computer, or a standalone monitor coupled to a desktop computing device, to name only a few examples.

User interface component 104A may provide a user interface from which a user may interact with client device 102A to cause client device 104A to perform one or more operations. For example, user interface component 104A may give a user access to a service, provided by information distribution system 112, for receiving content (e.g., social media, news, television, streaming audio, streaming video, or other types of content) distributed across network 128. As further described in this disclosure, information distribution system 112 may provide content via network 128 to client device 102A. Client device 102A may process and output the content as one or more graphical images, sounds, and haptic-feedback sensations, at user interface component 104A.

Client device 102A may include a client module 106A. Client module 106A may send information generated by a user to and receive information from an information network provided by information distribution system 112. For instance, a user may have a user account stored at information distribution system 112. The user account may include a unique identifier (e.g., a username) for the user, authentication credentials, and personal information (e.g., name, phone number, email address, home address, to name only a few examples). Client module 106A may authenticate with information distribution system 112 based at least in part on authentication credentials provided by the user to client device 102A.

In some examples, client module 106A may provide a graphical user interface (GUI) that enables a user to generate or otherwise compose user content that client module 106A sends to information distribution system 112. Such user content may include text, images, video, and/or audio information. In some examples, a user may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content, client module 106A may send user content to information distribution system 112, which may process and/or distribute the user content as further described in this disclosure.

In some examples, a user of client device 102A may compose a message that includes various content. In addition to content, a message may include one or more hashtags and/or mention tags. In some examples, a hashtag may represent or otherwise identify a particular topic associated with the content of a message. As such, a user composing a message on a particular topic may associate hashtag for the topic with the message. A mention tag may represent or otherwise identify a particular user that has a corresponding user account at information distribution system 112. A user composing a message who wishes to refer to or address another particular user may associate a mention tag for the particular user with the message. When a user generates user content 108, client device 102A may send user content to information distribution system 112, which may process and/or distribute user content 108 as further described in this disclosure.

Client module 106A may enable the user to perform one or more functions associated with user content. For instance, client module 106A may enable a user to "share," "re-share," "read," and "follow" content as well as "follow" and "mention" other users. In some examples, "sharing" a message or content may refer to composing an original message or original content that is subsequently distributed by information distribution system 112 to other users. In some examples, "re-sharing" a message or content may refer to an operation initiated by a user to re-post a message or content that was originally generated by another user. In some examples, "reading" a message or content may refer to an activity of a user to view the message or content. In some examples, "following" may refer to an operation initiated by a user to subscribe to messages and/or user content of another user. As such, a user that follows a particular user may receive updates of messages and/or user content generated by the particular user. In some examples, "mentioning" a particular user may refer to an operation initiated by a user to identify or otherwise associate the particular user with a message or user content.

Client module 106A may perform operations described herein using software, hardware, firmware, or a mixture of both hardware, software, and firmware residing in and executing by client device 102A or at one or more other remote computing devices. As such, client module 106A may be implemented as hardware, software, and/or a combination of hardware and software. Client device 102A may execute client module 106A as or within a virtual machine executing on underlying hardware. Client module 106A may be implemented in various ways. For example, client module 106A may be implemented as a downloadable or pre-installed application or "app." In another example, client module 106A may be implemented as part of an operating system of client device 102A.

Content provider system 124 may include targeted content 126. However, content provider system 124 may include more or fewer modules or data in other examples. Targeted content 126 may include data representing user accounts, demographic data about each user, user-generated content regarding a particular product, brand, or product market, and interest scores that represent a likelihood that a user of client device 102A would interact with an instance of targeted content 126 if it included a particular brand message.

As shown in FIG. 1, system 100 also includes information distribution system 112. Information distribution system 112 may implement techniques of this disclosure to receive inputs from client device 102A in response to messages output on client device 102A. Information distribution system 112 may be implemented as one or more computing devices, including but not limited to desktop computers, laptop computers, mainframes, servers, cloud computing systems, and the like.

Information distribution system 112 may include data and one or more modules, which, when executed, perform one or more operations. For example purposes, information distribution system 112 includes message module 114, user data 116, and targeted content 120. However, information distribution may include more or fewer modules or data in other examples. User data 116 may include data representing user accounts and demographic data about each user. As described above, a user account for a user of information distribution system 112 may include but is not limited to a user name, password, phone number, email address, and/or home address. In some examples, user data 116 may also include, current location of the user, devices authenticated with the user, interests of the user, history of content generated by the user, history of content read and/or followed by a user, hashtags and/or mention tags used by the user, other users followed by the user, private messages sent and/or received by the user, and/or search history of the user, to name only a few examples.

For instance, information distribution system 112 may include targeted content 120. Targeted content may include any targeted content created by content provider system 124 or any number of similar computing devices. In the instance where targeted content 120 includes targeted content created by content provider system 124, information distribution system 120 may receive targeted content 122 (e.g., targeted content created by content provider system 124) from content provider system 124 and store the received targeted content 122 in targeted content 120.

Information distribution system may also include user data 118. User data 118 may include data representing user accounts and demographic data about each user. A user account for a user of information distribution system 112 may include, but is not limited, to a user name, password, phone number, email address, and/or home address. In some examples, user data 118 may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

Information distribution system 112 may also include message module 114. Message module 114 may construct and maintain information generated by users and/or operators of information distribution system 112. Message module 114 may receive user content 108 from one or client devices, and store and organize the user content in the information network. The user content may be stored and organized using any number of datastores and data structures, such as but not limited to graphs, lists, tables, a Relational Database Management System (RDBMS), Object Database Management System (ODBMS), and/or Online Analytical Processing (OLAP) system.

In addition to performing one or more aspects of this disclosure, message module 114 may perform general techniques for message distribution. Message module 114 may parse or analyze user content to share or otherwise redistribute the user content to other users of information distribution system 112. For example, numerous users may each share or re-share content for a particular topic, and include or associate hashtag for the topic with the content. As an non-limiting example, multiple users may each share content about the Olympics and include a hashtag #Olympics with the content (e.g., text and/or pictures). Message module 114 may receive the content and parse the hashtag #Olympics to structure content associated with the hashtag as searchable. In this way, if a user wishes to view all content associated with #Olympics, the user may submit a query to message module 114, which may return a set of content or messages that include the hashtag #Olympics. In some examples, message module 114 may automatically send to a user's client device, without additional user intervention, content or messages that include the hashtag #Olympics, if the user previously searched for, shared, re-shared, and/or viewed content associated with the hashtag #Olympics.

Message module 114 may parse or analyze user content to share or otherwise redistribute the user content to other users of information distribution system 112 based at least in part on whether a user is following another particular user or has mentioned the particular user. For instance, if the user provides user input to client module 106A to follow a particular user, information distribution system 112 may receive an indication of the user input and store the indication with the user's account. When the particular user shares or re-shares content, information distribution system 112 may send the content to client device 102A such that the user can view the content. As another example, if the user mentions the particular user in shared or re-shared content, information distribution system 112 may receive the content and send the content or notification of the mention to a client device of the particular user that was mentioned. In some examples, message module 114 may store information about user content viewed by a particular user. For instance, client module 106A may send data that indicates the user has viewed specific user content to information distribution system 112. Message module 114 may store data that indicates the user has viewed the specific user content. Although a number of examples above have described how message module 114 determines relationships between user content and redistributes user content to client devices, many other examples of distributing content and determining relationships are also possible.

In some instances, the amount of content associated with a particular hashtag may grow or decline rapidly relative to content associated with other hashtags. The rapid change may be due to a particular event, controversy, person, or topic that captures or loses the interest of a large audience of users. Such change in the increase or decrease of content associated with the hashtag may represent a trend. A magnitude of a trend may represent the degree interest or engagement by an audience of users. For instance, if a magnitude of a trend is high, the degree of interest by the audience of users may be high. As an example, there may be relatively more users in the audience and those users may be more engaged in content for the particular event, controversy, person, or topic. Conversely, if a magnitude of a trend is low, the degree of interest by the audience of users may be low. As an example, there may be relatively fewer users in the audience and those users may be less engaged in content for the particular event, controversy, person, or topic.

In some examples, message module 114 may, in addition to re-distributing user content to client devices as described above, send targeted content 120 to client devices for display. Targeted content 120 may include, but is not limited to targeted content, offers, rewards, discounts, political information, public interest information, entertainment information, sports information, or any other informational content.

In accordance with the techniques of this disclosure, targeted content 120 may also include conversational targeted content. As shown in FIG. 1, distribution module 112 may send collocated content 110 that includes targeted content and/or distributed user content from other users. Client module 106A may generate a graphical user interface 130 for display that includes information included in collocated content 110, such as user content 134 and message options 140A-140B. In some examples, user interface 130 outputs information in a sequence or stream of "cards" or graphical user elements 132A-132D (hereinafter, "cards 132"). The sequence or stream of "cards" may be ordered in chronological or reverse chronological order, in some examples. As shown in FIG. 1, card 132B includes an icon 138A and user content 134. Card 132C includes an icon 138B and message options 140A-140B. Icon 138A may correspond to the particular user that shared or re-shared user content 134. Icon 138B may correspond to the particular content provider that provided card 132C.

As shown in FIG. 1, card 132C may be interspersed with other user content in graphical user interface 130. Accordingly, if a user is viewing a sequence or stream of cards, such as cards 132, information distribution system 112 may also include one or more cards with targeted content. As an example, if the sequence or stream of cards is associated with a specific topic, targeted content that is relevant to the specific topic may be included in the sequence or stream of cards.

In some examples, information distribution system 112 may receive targeted content from content providers operating one or more content provider systems, such as content provider system 124. Content providers may include promotion agencies, companies, public interest organizations, governments, individual persons, and political candidates, to name only a few examples. Such content providers may be interested in providing target content to users of information distribution system 112. More particularly, content providers may be interested in generating and displaying targeted content to specific audiences (e.g., sets of users of information distribution system 112) that are highly engaged or interested in a particular event, controversy, person, or topic.

In accordance with the techniques of this disclosure, message module 114 may receive, from content provider system 124, a first message (e.g., card 132C) including a first string of characters and at least one selectable graphical user interface element (e.g., message options 140A-140B). For example, message module 114 may receive card 132C from content provider system 124 belonging to a content provider in the car industry. Card 132C may include a string of characters that makes up a message asking which model of the content provider's line of products the user may prefer. In some examples, the first string of characters may include at least one hashtag. Card 132C may also include message option 140A and message option 140B, each of which include a respective model of the content provider's line of products. Message options 140A-140B may be interactive graphical user interface elements to be displayed at client device 102A in card 132C.

In response to receiving the first message, message module 114 may send, for display at user interface component 104A at client device 102A, the first message in card 132C. Client device 102A may present card 132C to a user of client device 102A in order to obtain feedback regarding the model preference of the user, as shown in FIG. 1.

Message module 114 may receive, from client device 102A, an indication of a first user input. The first user input may include a selection of a first selectable graphical user interface element of the at least one selectable graphical user interface element of the first message. For example, message option 140A may be an option for a first model of car, and message option 140B may be an option for a second model of car. The user of client device 102A may select message option 140B, as the user may prefer the second model of car to the first model of car. Client device 102A receives an indication of user input at user interface component 104A indicative of the user's preference of the second model of car. Message module 114 may then receive the indication of user input from client device 102A.

In response to receiving the indication of the first user input, message module 114 may send, for display at client device 102A, a second message including a second string of characters and a prompt for an indication of a second user input. The prompt for the indication of the second user input may prompt for one of an affirmation for information distribution system 112 to send the second string of characters to a group of one or more client devices for display or a denial restricting information distribution system 112 from sending the second string of characters to the group of one or more client devices for display. In some examples, the second string of characters in the second message may be an editable string of characters. In some examples, the second message further includes the at least one selectable graphical user interface element of the first message. Further, in some examples, the second string of characters may include at least one hashtag.

For example, upon receiving the indication of user input selecting message option 140B, information distribution system 112 may compose a default message that states "I love content provider's second model! You should all check it out here!" with a hyperlink to the content provider's website. In order to further engage the user, information distribution system 112 may send the composed message to client device 102A for user review. The user, in some examples, may edit the default message in order to customize the output that may be seen by one or more subscribers to the user's social media account.

Message module 114 may receive, from client device 102A, the indication of the second user input. In response to the second user input including the affirmation for information distribution system 112 to send the second string of characters to the group of one or more client devices for display, message module 114 may send, for display at the group of one or more client devices, the second string of characters. Conversely, in response to the second user input including the denial restricting information distribution system 112 from sending the second string of characters to the group of one or more client devices for display, message module 114 may refrain from sending the second string of characters to the group of one or more client devices for display.

For example, if the message is satisfactory, the user may input an indication of user input to client device 102A affirming that information distribution system 112 may output the message (e.g., the default message or the edited message as altered by the user) to the group of one or more client devices that may subscribe to a social media account of the user. In response to receiving the affirmation, message module 114 may send the message to the group of one or more client devices for display on the respective user interface components of the client devices belonging to the subscribers of the user's social media account. If, however, the user does not wish to have the message sent to their subscribers, the user may select the denial option. As such, information distribution system 112 may refrain from sending the message to the subscriber's client devices.

In general, information distribution system 112 may send an indication of the user interaction to content provider system 124 for the content provider's records. The information of the user interacting with the content in general, or, if the content includes multiple message options, the information of which message option the user selects may provide valuable information to the content provider for its marketing efforts.

In some examples, further in response to receiving the indication of the first user input, message module 114 may send, for display at client device 102A, an addendum to the first message. The contents of the addendum may be an additional string of characters or a media file. For instance, message module 114 may send an addendum with contents based on the selected option. In the example of FIG. 1, the user selected message option 140B to choose the second model. As such, the addendum may replace message options 140A-140B and include the string of characters "We love the second model, too!" In other examples, the contents of the addendum may be a media file, such as a video commercial for the second model of vehicle produced by the content provider.

The above techniques may enable a computing device to create a targeted message that enables an interactive experience with the user, rather than limiting a creator to only a one-sided message. These techniques may further enable a content provider, such as a content provider, to enable multiple forms of interaction via a single targeted message, thereby increasing the amount of content provided to the user without increasing the size of the content on the screen of the user's computing device. In some instances, media may be more effective in conveying information regarding a product, especially if the user receiving the content has provided an indication that they are interested in the product. By including an addendum to the message after the user interacts with the content, the content provider may more effectively send content to the user that interests the user rather than guessing which product the user may be interested in. As information distribution system 112 may send fewer pieces of targeted content that are ineffective, information distribution system 112 may potentially consume less battery power and produce less congestion over network 128.

Figure 2:
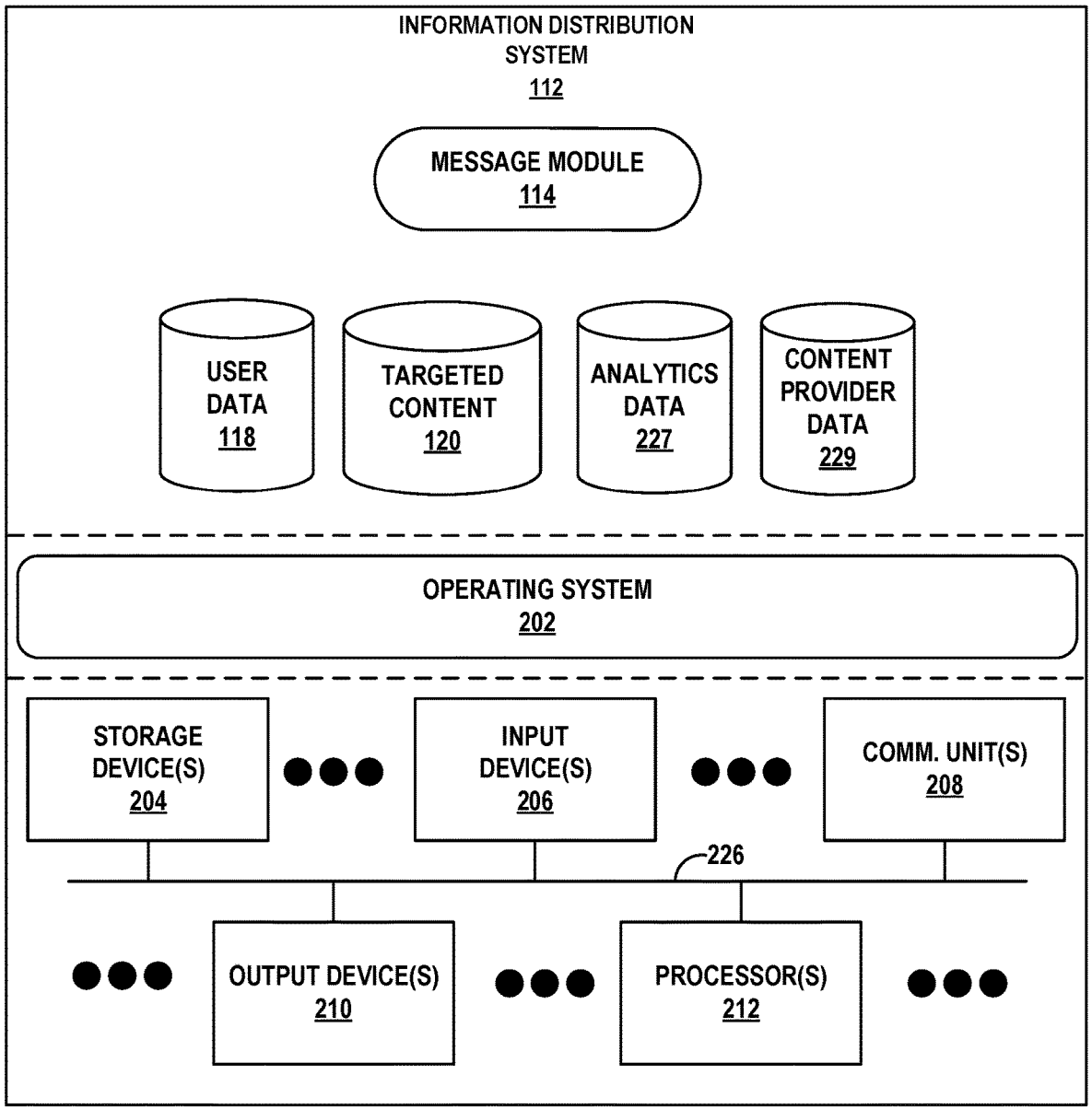
FIG. 2 is a block diagram illustrating details of an example information distribution system for managing conversational targeted content, in accordance with one or more aspects of the present disclosure.

FIG. 2 is a block diagram illustrating details of an example information distribution system for managing targeted content, in accordance with one or more aspects of the present disclosure. FIG. 2 illustrates only one particular example of information distribution system 112, and many other examples of information distribution system 112 may be used in other instances and may include a subset of the components included in example information distribution system 112 or may include additional components not shown in FIG. 2.

Information distribution system 112 may implement techniques of this disclosure to manage conversational targeted content. Information distribution system 112 may be implemented as one or more computing devices, including but not limited to: desktop computers, laptop computers, mainframes, servers, cloud computing systems, and the like.

Information distribution system 112 may include data and one or more modules, that when executed perform one or more operations. For example purposes, information distribution system 112 includes message module 114. However, information distribution system 112 may include more or data in other examples. User data 118 may include data representing user accounts and demographic data about each user. A user account for a user of information distribution system 112 may include, but is not limited, to a user name, password, phone number, email address, and/or home address. In some examples, user data 118 may also include, current location of the user, devices authenticated with the user, interests of the user, history of content generated by the user, history of content read and/or followed by a user, hashtags and/or mention tags used by the user, other users followed by the user, other users following the user, private messages sent and/or received by the user, and/or search history of the user, to name only a few examples.

Information distribution system 112, in some instances, may be in communication with a network. The network may be any communication network (e.g., public, private, commercial, governmental, or residential) that communicatively links two or more computing devices or systems for the transmission of information. For example, the network may be a wireless and/or wired network for transmitting data between two or more computing devices located at two or more different physical locations. In some examples, the network may represent the Internet. A client device, information distribution system 112, and a content provider system may send and receive data via the network, or one or more networks, using various suitable communication techniques. For instance, data may be transmitted between the devices using communication links, which may be wired and/or wireless. The network may include any required hardware for communicatively linking computing the client device, information distribution system 112, and the content provider system. For example, the network may include various switches, hubs, routers, and other network equipment that provides for the exchange of information between the devices.

The client device may be any type of personal computing device from which a person can view, listen to, feel, or otherwise obtain output based on information received via a network, such as the network. For example, the client device may be a laptop computer, a mobile telephone, phones, a tablet computers, a set-top box, a desktop computer, a server, a mainframe, a wearable device (e.g., a watch, computerized glasses, and the like), a personal digital assistant (PDA), a gaming system, a media player, an e-book reader, a television platform, a digital media player, an automobile navigation and/or entertainment system, or any other type of mobile and/or non-mobile computing device that is configured to communicate (e.g., transmit and receive data) across a network and output information received via the network to a user.

As shown in the example of FIG. 2, information distribution system 112 includes message module 114, user data 118, analytics data 227, content provider data 229, operating system 202, one or more storage devices 204, one or more input devices 206, one or more communication units 208, one or more output devices 210, one or more processors 212, and one or more communication channels 226.

Communication channels 226 may interconnect each of the components 202-229 for inter-component communications (physically, communicatively, and/or operatively). In some examples, communication channels 226 may include a system bus, a network connection, an inter-process communication data structure, or any other method for communicating data.

One or more input devices 206 of information distribution system 112 may receive input and one or more input devices 206 may generate output. Examples of input are tactile, audio, and video input and examples of output are tactile, audio, and video output. In one example, input devices 206 include a presence-sensitive display, touch-sensitive screen, mouse, keyboard, voice responsive system, video camera, microphone, or any other type of device for detecting input from a human or machine. Whereas in one example, output devices 210 include a presence-sensitive display, sound card, video graphics adapter card, speaker, cathode ray tube (CRT) monitor, liquid crystal display (LCD), or any other type of device for generating output to a human or machine.

One or more communication units 208 may allow information distribution system 112 to communicate, via one or more wired and/or wireless networks, with external devices and/or systems. For example communication units 208 may transmit and/or receive network signals being transmitted and received other devices and/or systems connected to the network. Examples of communication units 208 include network interface cards (e.g. such as an Ethernet card), optical transceivers, radio frequency transceivers, GPS receivers, or any other type of device that can send and/or receive information via a network. Other examples of communication units 208 may include long and short wave radios, cellular data radios, wireless network radios, as well as universal serial bus (USB) controllers.

One or more storage devices 204 of information distribution system 112 may store information or instructions that information distribution system 112 processes during operation of information distribution system 112. For example, storage devices 204 may store data that modules or components may access during execution at information distribution system 112. In some examples, storage devices 204 are temporary memories, meaning that a primary purpose of storage devices 204 is not long-term storage.

Storage devices 204 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 204 may be configured to store larger amounts of information than volatile memory and may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Storage devices 204, in some examples, include one or more computer-readable storage media. In some examples, storage devices 204 represent non-transitory computer readable storage medium that store instructions later executed by one or more processors 212 during operation of information distribution system 112. For example, storage devices 204 may store program instructions and/or information (e.g., data) associated with modules and/or components 114, 118, 120, 227, 229, and 202.

One or more processors 212 may implement functionality and/or execute instructions within information distribution system 112. For example, processors 212 on information distribution system 112 may receive and execute instructions stored by storage devices 204 that execute the functionality of modules 114, 118, 120, 227, 229, and 202. The instructions executed by processors 212 may cause information distribution system 112 to read/write/etc. information, such as one or more data files at user data 118 and/or analytics data 227 and stored within storage devices 204 during program execution. Processors 212 may execute instructions of modules 114, 118, 120, 227, 229, and 202 to cause information distribution system 112 to perform the operations described in this disclosure. That is, modules 114, 118, 120, 227, 229, and 202 may be operable by processors 212 to perform various actions or functions of information distribution system 112, for instance, detecting magnitudes of trends in user-generated content and facilitating the delivery of targeted content based on demographic data of the users associated with the user-generated content, in accordance with one or more aspects of the present disclosure.

Techniques of this disclosure may be applied to managing conversational targeted content. In accordance with the techniques of this disclosure, message module 114 may receive, from a content provider system, a first message including a first string of characters and at least one selectable graphical user interface element. For example, message module 114 may receive a card from the content provider system belonging to a content provider in the coffee industry. The card may include a string of characters that makes up a message asking which beverage offered by the content provider the user may prefer. In some examples, the first string of characters may include at least one hashtag. For instance, the first message may read "Which delicious coffee drink do you want to grab today? #BevA or #BevB?" In some instances, the message may also include media, such as image files, video files, or audio files. The card may also include one or more message options, each of which include a respective beverage offered by the content provider. For instance, the first message option may be associated with BevA, and the second message option may be associated with BevB. The message options may be interactive graphical user interface elements to be displayed at the client device in a card.

In response to receiving the first message, message module 114 may send, for display at a user interface component of the client device, the first message in the card. The client device may present the card to a user of the client device in order to obtain feedback regarding the model preference of the user.

Message module 114 may receive, from the client device, an indication of a first user input. The first user input may include a selection of a first selectable graphical user interface element of the at least one selectable graphical user interface element of the first message. For example, a first message option may be an option for a first coffee beverage, and a second message option may be an option for a second coffee beverage. The user of the client device may select the first message option, as the user may prefer the first coffee beverage (BevA) to the second coffee beverage (BevB). The client device may receive an indication of user input at its respective user interface component indicative of the user's preference of the second coffee beverage. Message module 114 may then receive the indication of user input from the client device.

In response to receiving the indication of the first user input, message module 114 may send, for display at the client device, a second message including a second string of characters and a prompt for an indication of a second user input. The prompt for the indication of the second user input may prompt for one of an affirmation for information distribution system 112 to send the second string of characters to a group of one or more client devices for display or a denial restricting information distribution system 112 from sending the second string of characters to the group of one or more client devices for display. In some examples, the second string of characters in the second message may be an editable string of characters. In some examples, the second message further includes the at least one selectable graphical user interface element of the first message. Further, in some examples, the second string of characters may include at least one hashtag.

For example, upon receiving the indication of user input selecting the first message option, information distribution system 112 may compose a default message that states "I can't wait to grab my #BevA from content provider! Doesn't it look scrumptious?" with a picture of BevA served by the content provider. In order to further engage the user, information distribution system 112 may send the composed message to the client device for user review. The user, in some examples, may edit the default message in order to customize the output that may be seen by one or more subscribers to the user's social media account.

Message module 114 may receive, from the client device, the indication of the second user input. In response to the second user input including the affirmation for information distribution system 112 to send the second string of characters to the group of one or more client devices for display, message module 114 may send, for display at the group of one or more client devices, the second string of characters. Conversely, in response to the second user input including the denial restricting information distribution system 112 from sending the second string of characters to the group of one or more client devices for display, message module 114 may refrain from sending the second string of characters to the group of one or more client devices for display.

For example, if the message is satisfactory, the user may input an indication of user input to the client device affirming that information distribution system 112 may output the message (e.g., the default message or the edited message as altered by the user) to the group of one or more client devices that may subscribe to a social media account of the user. In response to receiving the affirmation, message module 114 may send the message to the group of one or more client devices for display on the respective user interface components of the client devices belonging to the subscribers of the user's social media account. If, however, the user does not wish to have the message sent to their subscribers, the user may select the denial option. As such, information distribution system 112 may refrain from sending the message to the subscriber's client devices.

In general, information distribution system 112 may send an indication of the user interaction to the content provider system for the content provider's records. The information of the user interacting with the content in general, or, if the content includes multiple message options, the information of which message option the user selects may provide valuable information to the content provider for their marketing efforts.

In some examples, further in response to receiving the indication of the first user input, message module 114 may send, for display at the client device, an addendum to the first message. The addendum may be an additional string of characters or a media file. For instance, message module 114 may send an addendum based on the selected option. In the example of FIG. 2, the user selected the first message option to choose BevA. As such, the addendum may replace the message options and include the string of characters "Isn't BevA so refreshing?" In other examples, the addendum may be a media file, such as a video commercial for or a picture of the first coffee beverage offered by the content provider.

Figure 3:
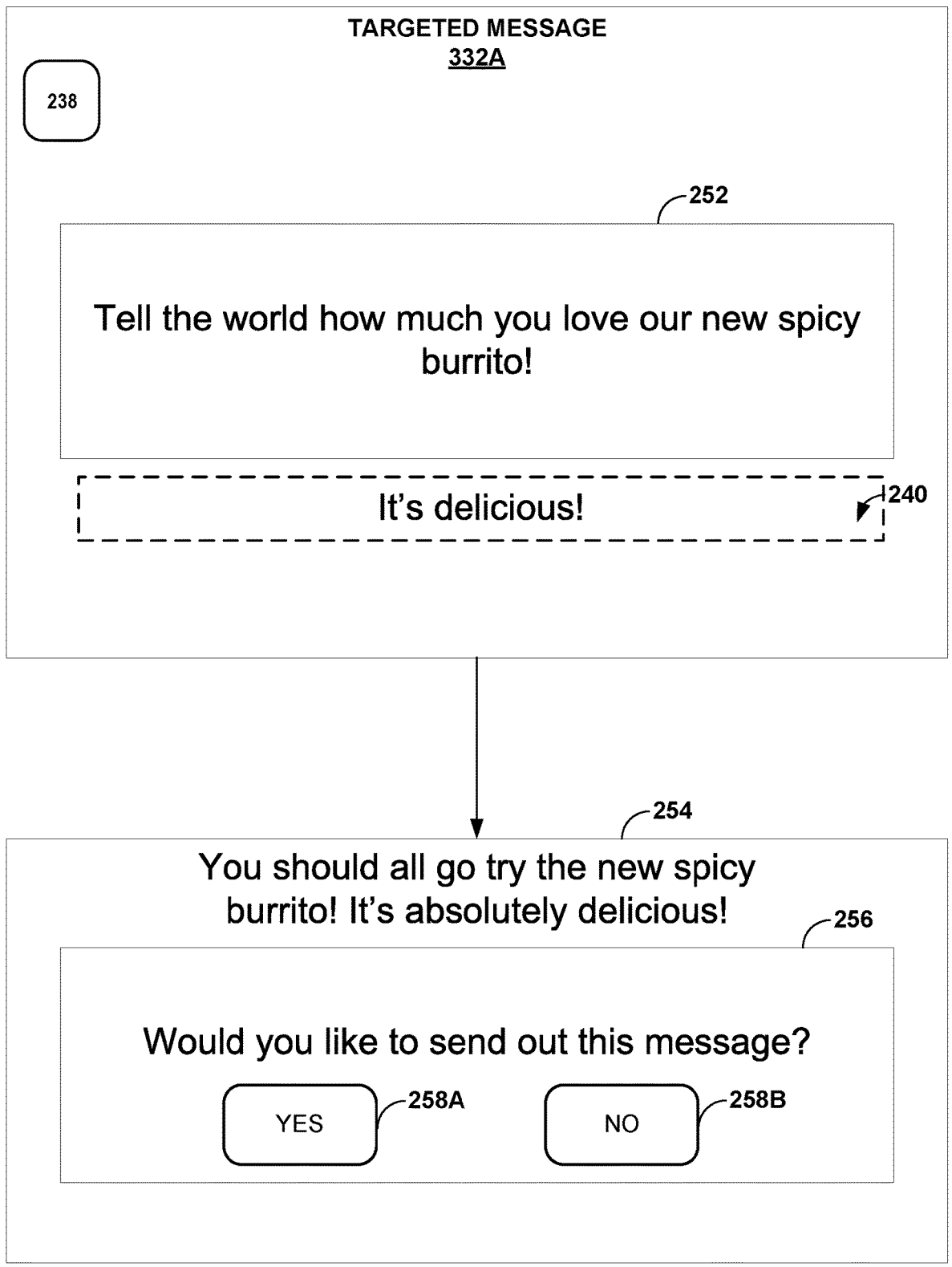
FIG. 3 is a conceptual diagram of example targeted messages that include conversational targeted content with a single conversation option to be displayed at one or more client devices, in accordance with one or more techniques of the disclosure.

FIG. 3 is a conceptual diagram of example targeted messages that include targeted content with a single conversation option to be displayed at one or more client devices, in accordance with one or more techniques of the disclosure. For purposes of illustration only, the example operations are described below within the context of information distribution system 112 and client device 102A, as shown in FIGS. 1 and 2.

In the example of FIG. 3, information distribution system 112 may send targeted message 332A to client device 102A for display at a user interface component of client device 102A. Targeted message may include icon 238, content 252, and message option 240. Icon 238 may correspond to the particular user that shared or re-shared targeted message 332A, such as the content provider.

In the example of FIG. 3, targeted message 332A includes only a single message option 240. Content 252 includes the message "Tell the world how much you love our new spicy burrito!" In an attempt to interact with the user, message option 240 may include the text "It's delicious!"

Responsive to client device 102A receiving an indication of user input selecting message option 240, client device 102A may send notify information distribution system 112 that the user selected message option 240. In response to receiving this notification, information distribution system 112 may send message 254 to client device 102A for display at the user interface component of client device 102A. Message 254 includes the editable text "You should all go try the new spicy burrito! It's absolutely delicious!" Message 254 also includes prompt 256, asking whether the user would like to post message 254 to their social media account. If the user selects option 258A, information distribution system 112 may send message 254 to a group of client devices that subscribe to the respective social media account of the user for display. If the user instead selects option 258B, information distribution system 112 may instead refrain from sending message 254 to the group of client devices that subscribe to the respective social media account of the user.

Figure 4:
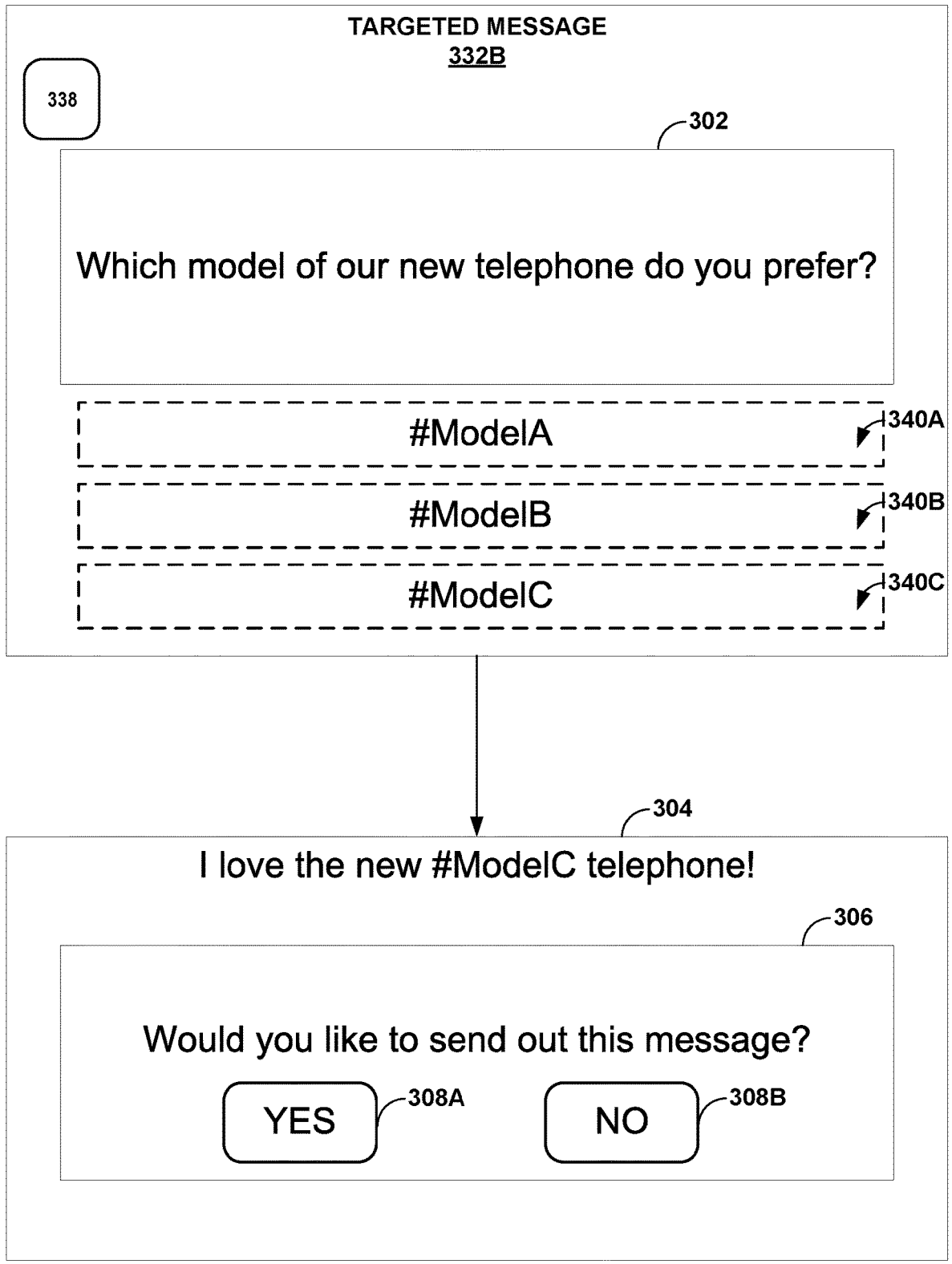
FIG. 4 is a conceptual diagram of example targeted messages that include conversational targeted content with multiple conversation options to be displayed at one or more client devices, in accordance with one or more techniques of the disclosure.

FIG. 4 is a conceptual diagram of example targeted messages that include targeted content with multiple conversation options to be displayed at one or more client devices, in accordance with one or more techniques of the disclosure. For purposes of illustration only, the example operations are described below within the context of information distribution system 112 and client device 102A, as shown in FIGS. 1 and 2.

In the example of FIG. 4, information distribution system 112 may send targeted message 332B to client device 102A for display at a user interface component of client device 102A. Targeted message may include icon 338, content 302, and message options 340A-340C. Icon 338 may correspond to the particular user that shared or re-shared targeted message 332B, such as the content provider.

In the example of FIG. 4, targeted message 332B includes three message options 340A-340C. Content 302 includes the message "Which model of our new telephone do you prefer?" In response to this question, targeted message 332B provides three message options 340A-340C. First message option 340A includes the text "#ModelA." Second message option 340B includes the text "#ModelB." Third message option 340C includes the text "#ModelC."

Responsive to client device 102A receiving an indication of user input selecting message option 340C, client device 102A may send notify information distribution system 112 that the user selected message option 340C. In response to receiving this notification, information distribution system 112 may send message 304 to client device 102A for display at the user interface component of client device 102A. Message 304 includes the editable text "I love the new #ModelC telephone!" Message 304 also includes prompt 306, asking whether the user would like to post message 304 to their social media account. If the user selects option 308A, information distribution system 112 may send message 304 to a group of client devices that subscribe to the respective social media account of the user for display. If the user instead selects option 308B, information distribution system 112 may instead refrain from sending message 304 to the group of client devices that subscribe to the respective social media account of the user.

Figure 5:
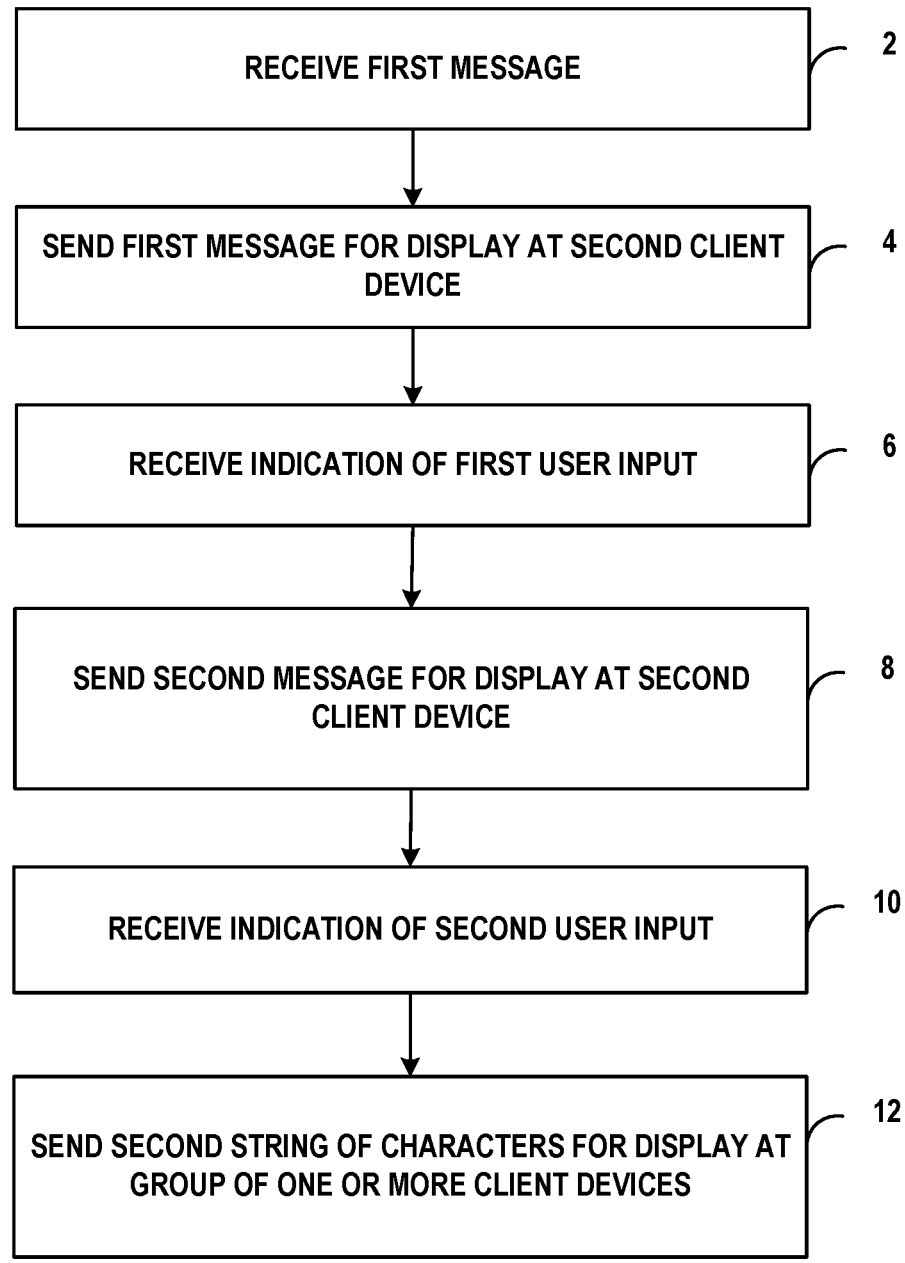
FIG. 5 is a flow diagram illustrating example operations for managing conversational targeted content in an information distribution system, in accordance with one or more aspects of the present disclosure.

FIG. 5 is a flow diagram illustrating example operations to implement techniques for managing targeted content, in accordance with one or more aspects of the present disclosure. The techniques of this disclosure may include actions not depicted in the flow diagram of FIG. 5. Conversely, the techniques of this disclosure may not include acts that are depicted in the flow diagram of FIG. 5. As such, the flow diagram of FIG. 5 should only be seen as one possible, non-limiting example of the techniques of this disclosure rather than a limiting iteration of steps that must be performed. For purposes of illustration only, the example operations are described below within the context of information distribution system 112, as shown in FIGS. 1 and 2.

As shown in FIG. 5, information distribution system 112 may receive (2), from a first client device, a first message including a first string of characters and at least one selectable graphical user interface element. In some examples, the first string of characters may include at least one hashtag. In response to receiving the first message, information distribution system 112 may send (4), for display at a second client device, the first message. Information distribution system 112 may receive (6), from the second client device, an indication of a first user input. The first user input may include a selection of a first selectable graphical user interface element of the at least one selectable graphical user interface element of the first message.

In response to receiving the indication of the first user input, information distribution system 112 may send (8), for display at the second client device, a second message including a second string of characters and a prompt for an indication of a second user input. The prompt for the indication of the second user input may prompt for one of an affirmation for the information distribution system to send the second string of characters to a group of one or more client devices for display or a denial restricting the information distribution system from sending the second string of characters to the group of one or more client devices for display. In some examples, the second string of characters in the second message may be an editable string of characters. In some examples, the second message further includes the at least one selectable graphical user interface element of the first message. Further, in some examples, the second string of characters may include at least one hashtag.

Information distribution system 112 may receive (10), from the second client device, the indication of the second user input. In response to the second user input including the affirmation for the information distribution system to send the second string of characters to the group of one or more client devices for display, information distribution system 112 may send (12), for display at the group of one or more client devices, the second string of characters. Conversely, in response to the second user input including the denial restricting the information distribution system from sending the second string of characters to the group of one or more client devices for display, information distribution system 112 may refrain from sending the second string of characters to the group of one or more client devices for display.

In some examples, further in response to receiving the indication of the first user input, information distribution system 112 may send, for display at the second client device, an addendum to the first message. The addendum may comprise a third string of characters or a media file. Further, contents of the addendum may be based at least in part on the selected first selectable graphical user interface element. For instance, the addendum may be content further describing or promoting the product associated with the first selectable graphical user interface element.

Throughout the disclosure, various examples are described where a computing device and/or a computing system may collect and/or analyze information (e.g., locations, speeds, the content of the user interface, etc.) associated with a computing device only if the computing device receives permission from the user to collect and/or analyze the information. For example, in situations discussed above in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device for privacy protection.

Further, to the extent that any generated content dispersed using the techniques of this disclosure contains any copyrighted material (e.g., copyrighted promotion material), the techniques described herein may further include requesting express permission from a copyright holder prior to distribution of said copyrighted material. This may include asking for permission each time copyrighted material will be distributed according to the techniques described herein or asking for permission to distribute copyrighted material once upon creating a user account and using the one-time permission throughout the life of the user account. The techniques described herein may not distribute copyrighted material without the express permission of the owner of said copyrighted material.

Example 1. A method comprising: receiving, by an information distribution system and from a first client device, a first message comprising a first string of characters and at least one selectable graphical user interface element; in response to receiving the first message, sending, by the information distribution system and for display at a second client device, the first message; receiving, by the information distribution system and from the second client device, an indication of a first user input, wherein the first user input comprises a selection of a first selectable graphical user interface element of the at least one selectable graphical user interface element of the first message; in response to receiving the indication of the first user input, sending, by the information distribution system and for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display; receiving, by the information distribution system and from the second client device, the indication of the second user input; and in response to the second user input comprising the affirmation for the information distribution system to send the second string of characters to the group of one or more client devices for display, sending, by the information distribution system and for display at the group of one or more client devices, the second string of characters.

Example 2. The method of example 1, further comprising: in response to receiving the indication of the first user input, sending, by the information distribution system and for display at the second client device, an addendum to the first message.

Example 3. The method of example 3, wherein the addendum comprises one of a third string of characters or a media file, wherein contents of the addendum are based at least in part on the selected first selectable graphical user interface element.

Example 4. The method of any of examples 1-3, wherein the second string of characters in the second message comprises an editable string of characters.

Example 5. The method of any of examples 1-4, further comprising: in response to the second user input comprising the denial restricting the information distribution system from sending the second string of characters to the group of one or more client devices for display, refraining, by the information distribution system, from sending the second string of characters to the group of one or more client devices for display.

Example 6. The method of any of examples 1-5, wherein the second message further comprises the at least one selectable graphical user interface element of the first message.

Example 7. The method of any of examples 1-6, wherein the first string of characters and the second string of characters each comprise at least one hashtag.

Example 8. The method of any of examples 1-7, wherein the second string of characters is based at least in part on the selected first graphical element.

Example 9. The method of any of examples 1-8, wherein the first message further comprises a media file.

Example 10. A non-transitory computer-readable storage medium storing instructions that, when executed, cause at least one processor to: receive from a first client device, a first message comprising a first string of characters and at least one selectable graphical user interface element; in response to receiving the first message, send, for display at a second client device, the first message; receive, from the second client device, an indication of a first user input, wherein the first user input comprises a selection of a first selectable graphical user interface element of the at least one selectable graphical user interface element of the first message; in response to receiving the indication of the first user input, send, for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display; receive, from the second client device, the indication of the second user input; and in response to the second user input comprising the affirmation for the information distribution system to send the second string of characters to the group of one or more client devices for display, send, for display at the group of one or more client devices, the second string of characters.

Example 11. The non-transitory computer-readable storage medium of example 10, further comprising instructions that, when executed, cause the at least one processor to: in response to receiving the indication of the first user input, send, for display at the second client device, an addendum to the first message comprising a third string of characters.

Example 12. The non-transitory computer-readable storage medium of example 11, wherein the addendum comprises one of a third string of characters or a media file, wherein contents of the addendum are based at least in part on the selected first selectable graphical user interface element.

Example 13. The non-transitory computer-readable storage medium of any of examples 10-12, wherein the second string of characters in the second message comprises an editable string of characters.

Example 14. The non-transitory computer-readable storage medium of any of examples 10-13, further comprising instructions that, when executed, cause the at least one processor to: in response to the second user input comprising the denial restricting the information distribution system from sending the second string of characters to the group of one or more client devices for display, refrain from sending the second string of characters to the group of one or more client devices for display.

Example 15. The non-transitory computer-readable storage medium of any of examples 10-14, wherein the second message further comprises the at least one selectable graphical user interface element of the first message.

Example 16. The non-transitory computer-readable storage medium of any of examples 10-15, wherein the first string of characters and the second string of characters each comprise at least one hashtag.

Example 17. The non-transitory computer-readable storage medium of any of examples 10-16, wherein the second string of characters is based at least in part on the selected first graphical element.

Example 18. The non-transitory computer-readable storage medium of any of examples 10-17, wherein the first message further comprises a media file.

Example 19. An information distribution system comprising: at least one processor; and at least one non-transitory computer-readable storage medium storing instructions that are executable by the at least one processor to: receive from a first client device, a first message comprising a first string of characters and at least one selectable graphical user interface element; in response to receiving the first message, send, for display at a second client device, the first message; receive, from the second client device, an indication of a first user input, wherein the first user input comprises a selection of a first selectable graphical user interface element of the at least one selectable graphical user interface element of the first message; in response to receiving the indication of the first user input, send, for display at the second client device, a second message comprising a second string of characters and a prompt for an indication of a second user input, wherein the prompt for the indication of the second user input prompts for one of an affirmation for the information distribution system to send the second string of characters to a group of one or more client devices for display or a denial restricting the information distribution system from sending the second string of characters to the group of one or more client devices for display; receive, from the second client device, the indication of the second user input; and in response to the second user input comprising the affirmation for the information distribution system to send the second string of characters to the group of one or more client devices for display, send, for display at the group of one or more client devices, the second string of characters.

Example 20. The information distribution system of example 19, wherein the non-transitory computer-readable storage medium further stores instructions that are executable by the at least one processor to: in response to receiving the indication of the first user input, send, for display at the second client device, an addendum to the first message comprising a third string of characters.

Example 21. A non-transitory computer-readable storage medium encoded with instructions that, when executed, cause at least one processor to perform any of the methods of examples 1-9.

Example 22. A computing system comprising: one or more computer processors; and a memory comprising instructions that, when executed by the one or more computer processors, cause the one or more computer processors to perform any of the methods of examples 1-9.

Example 23. An apparatus comprising means for performing any of the methods of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

Various examples of the disclosure have been described. Any combination of the described systems, operations, or functions is contemplated. These and other examples are within the scope of the following claims.

The invention claimed is:

1. A method comprising:
receiving, by an information distribution system and from a content provider via a first client device, a first message as a targeted message for display to a target user via a user interface of a second client device including a vertical series of cards, each card including a content section, wherein the first message is to be displayed as a targeted card from the content provider that includes targeted content in the content section of the targeted card, the targeted content within the content section further including a set of selectable graphical user interface elements that are displayed within the content section of the targeted card, each selectable graphical user interface element associated with generation of a user content card from the target user, the targeted card additionally including an element to permit the target user to re-share the targeted content displayed within the content section of the targeted card;
in response to receiving the first message, sending, by the information distribution system and for display at the second client device associated with the target user, the first message as the targeted card within the user interface and from the content provider;
receiving, by the information distribution system and from the second client device, an indication of a first user input, wherein the first user input comprises a selection of a first selectable graphical user interface element of the set of selectable graphical user interface elements within the content section of the targeted card displayed at the user interface of the second client device;
in response to receiving the indication of the first user input, generating, by the information distribution system and for display at the second client device as a user-generated message, the user content card including a second message and a prompt for an indication of a second user input to grant or deny permission for the information distribution system to send the second message to a group of one or more client devices for display, the content of the second message based on the selection of the first selectable graphical user interface element;
receiving, by the information distribution system and from the second client device, the indication of the second user input; and
in response to the second user input comprising the affirmation for the information distribution system to send the second message to the group of one or more client devices for display, sending, by the information distribution system and for display within corresponding vertical series of cards of the group of one or more client devices, the user generated card from the target user that includes the second message in the content section of the user content card.

2. The method of claim 1, further comprising:
in response to receiving the indication of the first user input, sending, by the information distribution system and for display at the second client device, an addendum to the first message.

3. The method of claim 2, wherein the addendum comprises one of a string of characters or a media file, wherein contents of the addendum are based at least in part on the selected first selectable graphical user interface element.

4. The method of claim 1, wherein the second message comprises an editable string of characters.

5. The method of claim 1, further comprising:
in response to the second user input comprising the denial restricting the information distribution system from sending the second message to the group of one or more client devices for display, refraining, by the information distribution system, from sending the second message to the group of one or more client devices for display.

6. The method of claim 1, wherein the second message further comprises the first selectable graphical user interface element of the first message.

7. The method of claim 1, wherein the first message and the second message each comprise at least one hashtag.

8. The method of claim 1, wherein the first message further comprises a media file.

9. A non-transitory computer-readable storage medium storing instructions that, when executed, cause at least one processor to:
receive from a content provider via a first client device, first message as a targeted message for display to a target user via a user interface of a second client device including a vertical series of cards, each card including a content section, wherein the first message is to be displayed as a targeted card from the content provider, the first message further including a set of selectable graphical user interface elements that are displayed within the first message each selectable graphical user interface element associated with generation of a user content card from the target user;

in response to receiving the first message, send, for display at the second client device associated with the target user, the first message as the targeted card within the user interface and from the content provider;

receive, from the second client device, an indication of a first user input, wherein the first user input comprises a selection of a first selectable graphical user interface element of the set of selectable graphical user interface elements;

in response to receiving the indication of the first user input, generate, for display at the second client device as a user-generated message, the user content card including a second message, and a prompt for an indication of a second user input to grant or deny permission for the information distribution system to send the second message to a group of one or more client devices for display, the content of the second message based on the selection of the first selectable graphical user interface element;

receive, from the second client device, the indication of the second user input; and in response to the second user input comprising the affirmation for the information distribution system to send the second message to the group of one or more client devices for display, send, for display at within corresponding vertical series of cards of the group of one or more client devices, the user generated card from the target user that includes the second message in the content section of the user content card.

10. The non-transitory computer-readable storage medium of claim 9, further comprising instructions that, when executed, cause the at least one processor to:
in response to receiving the indication of the first user input, send, for display at the second client device, an addendum to the first message comprising a string of characters.

11. The non-transitory computer-readable storage medium of claim 10, wherein the addendum comprises one of a string of characters or a media file, wherein contents of the addendum are based at least in part on the selected first selectable graphical user interface element.

12. The non-transitory computer-readable storage medium of claim 9, wherein the second message comprises an editable string of characters.

13. The non-transitory computer-readable storage medium of claim 9, further comprising instructions that, when executed, cause the at least one processor to:
in response to the second user input comprising the denial restricting the information distribution system from sending the second message to the group of one or more client devices for display, refrain from sending the second message to the group of one or more client devices for display.

14. The non-transitory computer-readable storage medium of claim 9, wherein the second message further comprises the first selectable graphical user interface element of the first message.

15. The non-transitory computer-readable storage medium of claim 9, wherein the first message and the second message each comprise at least one hashtag.

16. The non-transitory computer-readable storage medium of claim 9, wherein the first message further comprises a media file.

17. An information distribution system comprising:
at least one processor; and
at least one non-transitory computer-readable storage medium storing instructions that are executable by the at least one processor to:
receive from a content provider via a first client device, a first message as a targeted message for display to a target user via a user interface of a second client device including a vertical series of cards, each card including a content section, wherein the first message is to be displayed as a targeted card from the content provider that includes targeted content in the content section of the targeted card, the targeted content within the content section further including a selectable graphical user interface element that is displayed within the content section of the targeted card, the at least one selectable graphical user interface element associated with generation of a user content card from the target user, the targeted card additionally including an element to permit the target user to re-share the targeted content displayed within the content section of the targeted card;

in response to receiving the first message, send, for display at the second client device associated with the target user, the first message as the targeted card within the user interface and from the content provider;

receive, from the second client device, an indication of a first user input, wherein the first user input comprises a selection of the selectable graphical user interface element within the content section of the targeted card displayed at the user interface of the second client device;

in response to receiving the indication of the first user input, generate, for display at the second client device as a user-generated message, the user content card including a second message and a prompt for an indication of a second user input to grant or deny permission for the information distribution system to send the second message to a group of one or more client devices for display;

receive, from the second client device, the indication of the second user input; and in response to the second user input comprising the affirmation for the information distribution system to send the second message to the group of one or more client devices for display, send, for display at within corresponding vertical series of cards of the group of one or more client devices, the user generated card from the target user that includes the second message in the content section of the user content card.

18. The information distribution system of claim 17, wherein the non-transitory computer-readable storage medium further stores instructions that are executable by the at least one processor to:
in response to receiving the indication of the first user input, send, for display at the second client device, an addendum to the first message comprising a string of characters.

* * * * *